July 26, 1960
J. RUETTIGER
2,946,259
SOLID OCULARS
Filed June 22, 1956
2 Sheets-Sheet 2
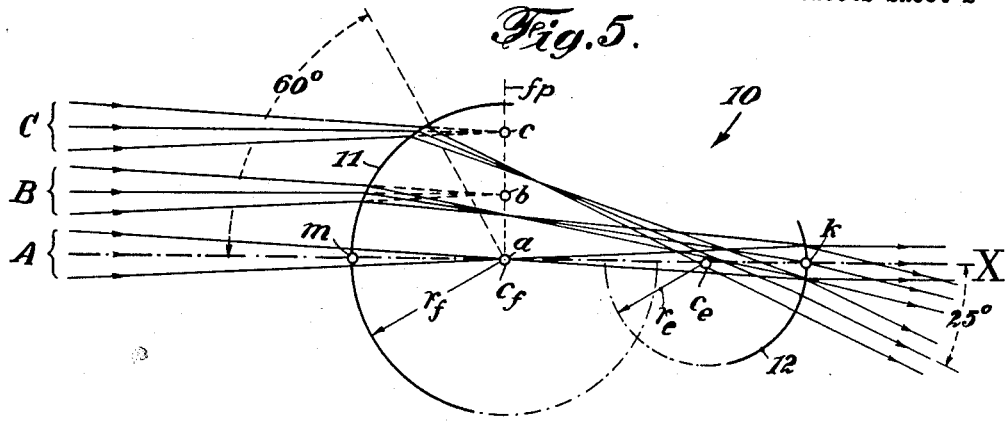
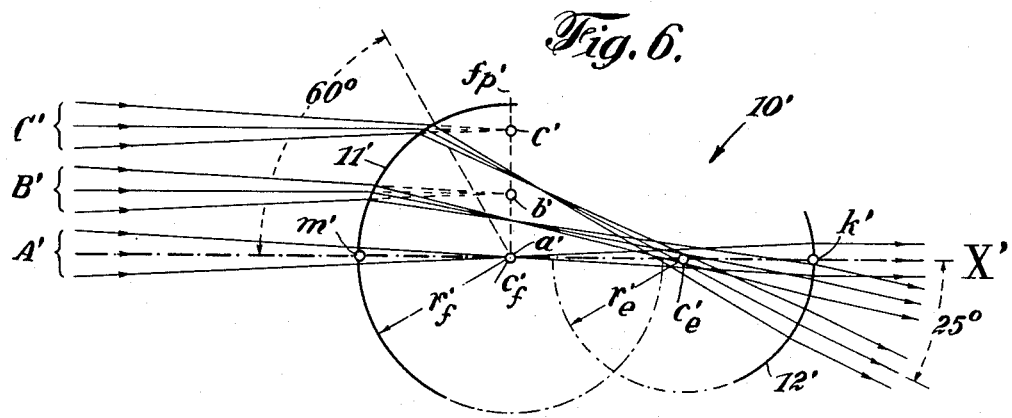
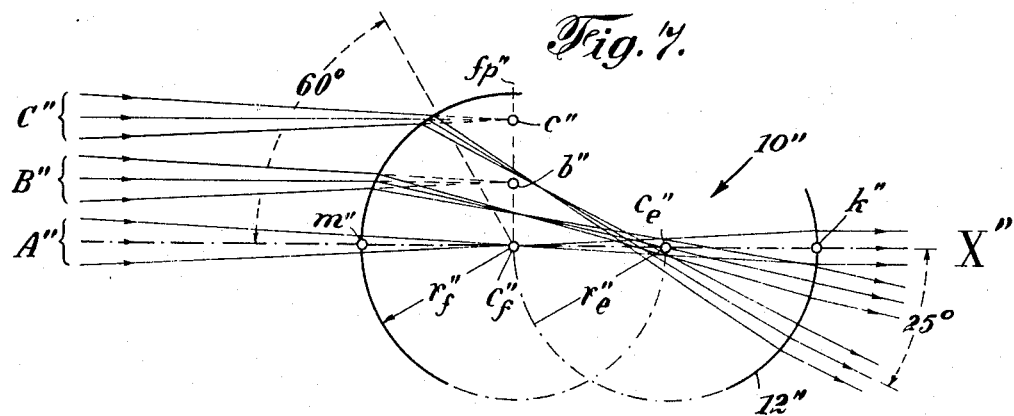
INVENTOR
Justin Ruettiger
BY C.P. Goepel
his ATTORNEY

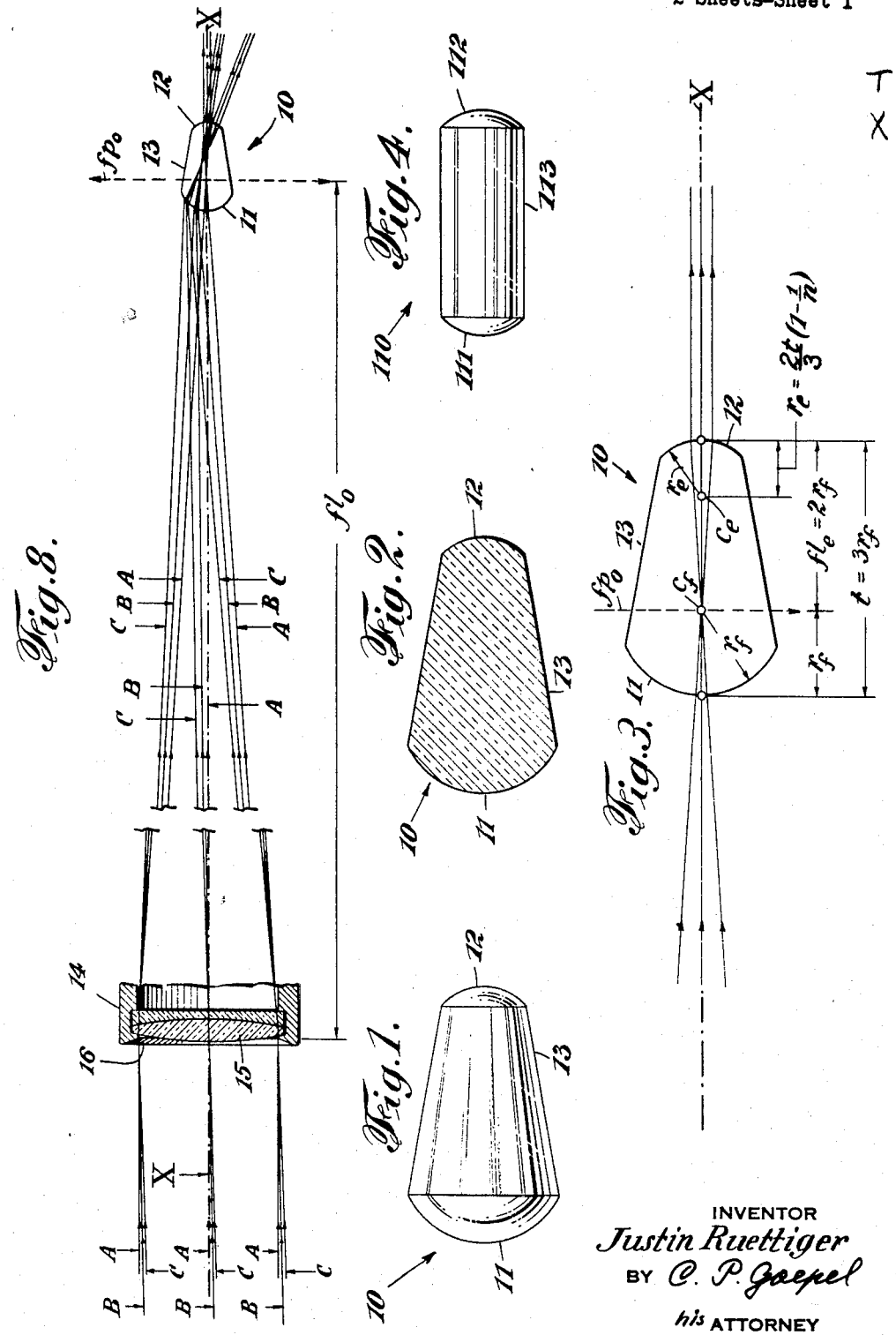

United States Patent Office 2,946,259
Patented July 26, 1960

2,946,259
SOLID OCULARS

Justin Ruettiger, 1815 Monroe Ave., New York, N.Y.

Filed June 22, 1956, Ser. No. 593,207

1 Claim. (Cl. 88—57)

This invention relates to solid oculars or eye pieces for use with telescopes, microscopes and other optical instruments.

Solid oculars are unitary bodies of optical material having two optical surfaces. The prior optical pieces of such character, while free of flare, have a satisfactory definition only in a limited area in the center of their field of view and are not corrected for various aberrations.

The principal object of this invention is to provide oculars of the above type which have greatly improved definition over the entire field of view.

Another object of the invention is to provide solid oculars with improved definition for light rays inclined to the axis of the optical instrument.

A further object of the invention is to provide solid oculars which eliminate or greatly reduce certain lens aberrations that tend to retard the definition.

An additional object of the invention is to provide solid oculars with improved achromatic characteristics over the entire field of view.

A yet further object of the invention is to provide solid oculars with a plano field of view at least in the central portions thereof.

The above and other objects are achieved by the provision of a solid ocular having a conical or a cylindrical contour concentric to its axis, a spherical field-end optical surface the radius of curvature of which is directly proportional to its thickness and also to its focal length, and a spherical eye-end optical surface the radius of curvature of which is a function of either the radius of curvature of its field-end surface, its thickness, or its focal length and of the refractive index of the optical material selected for the ocular.

More specifically, the novel ocular having a spherical convex field-end surface, a spherical convex eye-end surface and a conical or cylindrical contour, is so constructed that the value of its thickness equals three times the value of its field-end radius, and its radius of curvature of the eye-end surface is a function of either the focal length, the thickness, or the field-end radius and the refractive index of the optical material for the selected wave length of light for which the ocular is computed.

By accepting, for the purpose of better understanding of my invention, the thickness of the ocular as a unit, the field-end radius thereof then equals one-third of such a unit and the focal length of its eye-end surface two-thirds of such a unit, by accepting as a unit the value of the field-end radius, it is obvious that the thickness of the ocular then equals three such units and the focal length of the eye-end surface two such units, it also is clear that if one accepts the focal length of the eye-end surface as a unit the thickness of the ocular then equals three-halves of such a unit, and the field-end radius one-half of such a unit, and the value of the radius of curvature of the eye-end surface may be obtained by the formula $$r_e = fl_e = 2r_t = \frac{2t}{3}\left(1 - \frac{1}{n}\right)$$

wherein $fl_e$ is the focal length of the eye-end surface, $r_t$ is the field-end radius, $t$ is the thickness of the ocular, and $n$ is the refractive index of the selected optical material.

Various other advantages and novel characteristics of the solid ocular constructed in accordance with my invention will become apparent in the course of the following detailed description of some preferred embodiments which are illustrated in the accompanying drawing, and the invention will be finally pointed out in the appended claim.

In the drawing,

Fig. 1 is a side elevational view of a solid ocular of conical contour;

Fig. 2 is a vertical axial section through the ocular of Fig. 1;

Fig. 3 is a diagrammatic view of the ocular, showing the relation between the dimensions thereof by taking the length of the field-end radius as a unit;

Fig. 4 is a side elevational view of a cylindrical solid ocular;

Figs. 5 to 7 are diagrammatic views showing the path of light rays traversing solid oculars of this invention with different refractive indices; and Fig. 8 is a somewhat schematic illustration of the path of light rays from a refractor telescope objective toward and through the novel solid ocular.

Referring now to the drawing, and first to Figs. 1 and 2, the solid ocular 10 includes a pair of spherical, convex, optical surfaces 11, 12, and a peripheral conical surface 13. By an optical surface is meant a surface ground and polished in accordance with the standards of precision optics. Surface 11 is called the field-end surface, and the surface 12 the eye-end surface, while the surface 13 is referred to as the contour of the ocular 10. Contour 13 is concentric with the optical axis X of the ocular 10. As seen in Fig. 2, the ocular 10 is a solid piece of optical material.

The concept of my invention is best expressed in Fig. 3. The radius of curvature $r_t$ of the field-end surface 11 equals one-third of the total length or thickness $t$ of the ocular 10, and one-half of the focal length $fl_e$ of the eye-end surface 12. This holds true for all the oculars constructed in accordance with my invention, as well as that the focal plane $fp_0$ of the telescope or microscope objective, when used with my novel solid ocular, be perpendicular to and intersect the optical axis X of the ocular at the center of curvature $c_t$ of the field-end surface 11.

The radius of curvature $r_e$ of the eye-end surface 12 is obtained by dividing either the value of the focal length $fl_e$, the value of two field-end radii $2r_t$, or the value of two-thirds of the thickness of the ocular $$\frac{2t}{3}$$

with the value of the refractive index $n$ of the optical material selected for the ocular 10 and by subtracting the resultant quotient from either $$fl_o, \ 2r_t, \ \text{or} \ \frac{2t}{3}$$

depending on the dimension chosen for the computation. The center of curvature $c_e$ of the surface 12 is in the optical axis X. The length of radius $r_e$ expressed as a function of focal length $fl_e$, of the thickness $t$, or of the radius $r_t$, respectively, is:

$$r_e = fl_e\left(1-\frac{1}{n}\right) = \frac{2t}{3}\left(1-\frac{1}{n}\right) = 2r_t\left(1-\frac{1}{n}\right)$$

where $n$ represents the refractive index of the optical medium of the ocular.

Fig. 4 shows an ocular 110 with a field-end surface 111, an eye-end surface 112 and a cylindrical contour 113.

For example, if the selected focal length $fl_e$ of the surface 12, which equals $2r_t$ and also equals $$\frac{2t}{3}$$

of the ocular, is 0.75", the radius $r_t$ equals 0.375" and the thickness of the ocular is 1.125". The selection of the focal length $fl_e$, equalling $2r_t$, and also equalling $$\frac{2t}{3}$$

depends on the desired magnification the objective is to achieve in connection with the solid ocular.

To determine the radius $r_e$, it is essential to know the refractive index of the optical material, especially in that region of the visual spectrum where optimum performance of the ocular is desired. The region usually selected for observation purposes is approximately in the center of the visual spectrum at the wavelengths of about 555 millimicrons, since the human eye is most sensitive in that region. However, other regions of the spectrum may be selected for certain purposes and under certain conditions.

Assuming now that a well known, suitable and readily available optical medium, such as BK7 glass, is selected as the material for the ocular 10, this material has a refractive index $n=1.51667$ for the $d$ line at 587.6 millimicrons, and a V value of 64.34. The radius of curvature $r_e$ is obtained by dividing 0.75 by 1.51667, which gives a quotient of 0.4945044; this quotient is then subtracted from the value of either the focal length, i.e., 0.75, and the resultant value of 0.2554956 is the length $$2r_t \text{ or } \frac{2t}{3}$$

depending on the expression chosen, of radius $r_e$ in inches for the $d$ line of the spectrum.

Variations in the length of radius above and below the value of 0.2554956 result in corresponding variations in the wavelength of the spectrum where the ocular is at its best.

Transparent media best suited as the optical material for the novel ocular are those having low dispersive power, but for special purposes and/or when the ocular is to be used in connection with narrow-band filters, different media may be employed with advantage.

Media having low dispersive power, i.e., a high V value, are: fluor crown glasses having an index of refraction for the $d$ line $nd=1.48763$, or above, and a V value of 70.37 or below; fused quartz with an $nD=1.4585$ (D line=589.3 millimicrons) and a V value of 67.9; some borosilicate crown glasses, some barium crown glasses, and others.

The refractive index of the optical medium selected for the ocular influences the position of the exit pupil relative to the eye end, as well as the distortion and longitudinal chromatism of the ocular, as will be more fully explained hereinafter in connection with Figs. 5, 6 and 7.

In Fig. 5, A, B and C represent three converging beams of light rays coming from the full opening 16 of the refractor objective 15 in a telescope 14 shown in Fig. 8. The beam A originates from paraxial rays, beam B from parallel rays inclined with respect to the axis X of the telescope objective, and the beam C from parallel rays still more inclined to the axis X.

The beams A, B, C are refracted at the surface of the telescope objective 15 to come to a focus in the focal plane $fp$ of the telescope objective at the points $a$, $b$, $c$, respectively. The center of curvature $c_t$ of the surface 11 coincides with the point $a$. The beam A strikes the surface normally, its central ray at the point $m$ on the axis X, and thus there is neither deviation nor dispersion of the light rays of said beam A; they advance toward, through and past point $a$ in the focal plane to reach the surface 12 at the eye end of the ocular, as at $k$. The light rays of beam A are refracted, deviated and dispersed on surface 12 in such manner that, provided the refractive index of the optical material of the ocular 10 is $n=1.50$, those rays for which the index is 1.50 and which are close to the axis X emerge parallel with the axis X. The rays of beam B strike the surface 11 at an angle and are refracted, deviated and dispersed; thereupon they intersect one another behind the focal plane of the telescope objective and advance toward the surface 12 to be subjected to repeated refraction, deviation and dispersion. The refraction of rays of the beam B on surface 12 occurs in a manner that the rays for which the refractive index of the optical material is 1.50 and which pass close to the center of curvature $c_e$ of the eye-end surface 12, emerge as parallel to one another, the aberrations induced at the surface 11 being considerably reduced at the surface 12.

The light rays of beam C strike the surface 11 at an angle more acute than the angle of incidence of the rays of beam B, and thus their deviation and dispersion are greater. However, here again, some aberrations are reduced by refraction when the rays of beam C reach the surface 12, and those rays which pass close to the center of curvature $c_e$ of the eye-end surface 12 emerge as parallel with the ray passing directly through the point $c_e$. Thus, the emergent rays of the beams B and C, when an observer is looking in their direction, show the object in fine detail and the field as a whole, including its central portion, is sharper than in prior oculars. All this is due to the above described selection of the length of radii $r_e$, $r_t$, the thickness $t$ of the ocular, the focal length $fl_e$ of the eye-end surface, and the fact that the focal plane $fp_o$ of the telescope objective 15 intersects the center of curvature at the field end of the ocular 10 normally to the axis X and partitions off one-third thereof.

A segment of about 120° of the field-end surface 12 of the ocular as the refractive area, i.e., about 60° on one side of the axis X taken in mirror reverse in Figs. 5, 6 and 7, results in an observation area 12 at the eye end of the ocular 10 with an angle of about 50°, i.e., about 25° on one side of the axis X of the ocular taken in mirror reverse. Although the useful observation area extends over a field of about 50°, it cannot be utilized at one time because the exit pupil is not accessible, but it may be utilized successively or serve as a view finder.

Fig. 6 illustrates diagrammatically the path of light rays forming the beams A', B', and C', through an optical medium with a refractive index $n=1.75$. An increase in the refractive index causes increase in the radius $r_e'$ and its exit pupil which is near the center of curvature of the eye-end surface 12 is farther inside the ocular 10'. A lesser number of light rays enters an observer's eye at a time, the field of view and the illumination are more restricted than in Fig. 5, chromatism is more but the distortion of the field less pronounced, while the other characteristics remain similar.

In Fig. 7, the refractive index of the optical material of ocular 10" is 2.00 and the radii $r_t''$, $r_e''$ are equal. As the exit pupil is still farther inside the ocular 10", a lesser number of light rays enters the observer's eye than in Fig. 6, and thus the view and illumination are further restricted. However, though the longitudinal chromatism is more pronounced, the center of the field of view is practically plano, as the central rays of light beams A", B" and those therebetween (not shown) all pass practically through the center $r_e''$ of curvature of the eye-end surface 12" and therefore their aberrations, with the exception of chromatism, are zero for all practical purposes.

It will be seen that, despite the different refractive indices of the oculars diagrammatically shown in Figs. 5, 6 and 7, the focal lengths of their eye-end surfaces 12, 12', 12", the angles which the emergent light rays form with the axes X, X', X" of said oculars and their enlargements are equal because their lengths and consequently their field-end radii $r_f$, $r_f'$ and $r_f''$ are equal.

In order to retard more or less either longitudinal chromatic aberration or distortion in the field of view of the solid ocular of this invention, a medium with a higher or lower refractive index should be chosen. A medium with a low refractive index, especially when combined with a high V value, retards chromatism when the relation of the distance between the two surfaces of the ocular and their respective focal lengths come close to the known equation of achromatism for two lenses of the same medium, namely, $$a = \frac{f_1 + f_2}{2}$$

wherein $a$ is the distance between two lenses, $f_1$ is the focal length of the one and $f_2$ the focal length of the other lens. It increases distortion, illumination and the field of view of an ocular, whereas a higher refractive index causes increased chromatism but retards distortion, illumination, and reduces the field of view.

The solid ocular of this invention does not fully satisfy the above requirement for achromatism, but the remaining chromatism is not a disadvantage; in fact, it is less pronounced than chromatism resulting from the secondary spectrum of many cemented achromatic oculars because the rays of the novel ocular emerge as parallel rays for the center of the spectrum and nearly parallel for the regions close to that center, their diffraction patterns overlap color over color and an observer's eye gets the impression of white light except at the fringe of the field where there is an orange-red color. Thus, the parallelism of the emergent individual bundles of light rays in a complex way actually improves achromatism in the novel ocular.

The refractive index range of media available for my novel oculars is between 1.45 and 2.00. Most preferred are media with refractive indices between 1.45 and 1.53 which may be used in solid oculars for all ordinary purposes, the air being considered to have a refractive index of 1.00.

While the novel solid ocular cannot be considered achromatic, it closely approaches achromatism when made of an optical material with a refractive index $n$ between 1.45 and 1.50, and a V value of at least 65.00 or above. It also cannot be considered aplanatic even though it has a very plano field of view at least in the central portion thereof when the refractive index is close to 2.00. It will be observed that, irrespective of the refractive index of the selected optical material, at least narrow bundles of light rays over substantially the entire field of view emerge as parallel rays in the solid ocular of my invention. This means that the definition is sharp over the entire field of view for that region of the spectrum for which the ocular is computed, whereas the definition of prior oculars is sharp only in that zone of the field in which the rays emerge as parallel bundles.

What I claim and desire to secure by Letters Patent of the United States is:

A solid ocular for an optical instrument and prepared free of coma and astigmatism for all zones, comprising a contour portion, a field-end portion having a spherical convex optical surface, and an eye-end portion having a spherical convex optical surface, said contour portion being coaxial with the optical axis of said ocular, the thickness of said ocular corresponding to three times the value of the radius of curvature of said field-end portion, the value of said radius of curvature of the latter being equal to one-half the value of the focal length of said eye-end portion, said focal length being two-thirds of the thickness of said ocular, and the radius of curvature of said eye-end portion being equal to $$\frac{2t}{3}\left(1 - \frac{1}{n}\right)$$

wherein $t$ is the thickness of said ocular and $n$ is about 1.45 to 2.00 as the refractive index of the optical material selected for said ocular for the wave length of light for which the ocular is computed.

References Cited in the file of this patent

UNITED STATES PATENTS

| 13,603 | Tolles | Sept. 25, 1855 |
| 488,506 | McIlwain | Dec. 20, 1892 |

FOREIGN PATENTS

| 125,430 | Great Britain | Apr. 24, 1919 |
| 552,355 | France | Jan. 19, 1923 |